United States Patent
Nicholson (10) Patent No.: US 8,064,721 B2
(45) Date of Patent: Nov. 22, 2011

(54) METHOD AND APPARATUS FOR REMOVING NOISE FROM A DIGITAL IMAGE

(75) Inventor: Dennis G. Nicholson, Atherton, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/648,250

(22) Filed: Dec. 28, 2009

(65) Prior Publication Data

US 2010/0166307 A1    Jul. 1, 2010

Related U.S. Application Data

(63) Continuation of application No. 11/291,552, filed on Nov. 30, 2005, now Pat. No. 7,660,483.

(51) Int. Cl.
*G06K 9/40* (2006.01)

(52) U.S. Cl. .................... 382/275; 348/666; 358/3.26

(58) Field of Classification Search .................. 348/241, 348/533, 607, 666, 683, 701, 908; 358/3.26, 358/463; 382/275; 702/17, 191
See application file for complete search history.

(56) References Cited

U.S. PATENT DOCUMENTS

| | | | |
|---|---|---|---|
| 4,888,812 A * | 12/1989 | Dinan et al. | ................ 382/140 |
| 5,195,147 A | 3/1993 | Ohta | |
| 5,337,373 A | 8/1994 | Marandici et al. | |
| 5,457,754 A * | 10/1995 | Han et al. | ................ 382/128 |
| 5,471,434 A | 11/1995 | Davis et al. | |
| 5,542,006 A | 7/1996 | Shustorovich et al. | |
| 5,841,902 A * | 11/1998 | Tu | ................ 382/187 |
| 6,728,401 B1 | 4/2004 | Hardeberg | |
| 2002/0101543 A1 | 8/2002 | Ojo et al. | |
| 2003/0068093 A1* | 4/2003 | Baggs | ................ 382/261 |
| 2006/0008151 A1 | 1/2006 | Lin et al. | |
| 2006/0269111 A1 | 11/2006 | Stoecker | |
| 2007/0040062 A1 | 2/2007 | Lau et al. | |
| 2007/0083114 A1 | 4/2007 | Yang et al. | |
| 2009/0262223 A1* | 10/2009 | Hwang | ................ 348/241 |

FOREIGN PATENT DOCUMENTS

| | | |
|---|---|---|
| JP | 63 250787 | 10/1988 |
| WO | 01/26038 | 4/2001 |

OTHER PUBLICATIONS

International Search Report in Application PCT/US2006/061294, mailed Apr. 17, 2007.

\* cited by examiner

*Primary Examiner* — Gregory F Cunningham
(74) *Attorney, Agent, or Firm* — Robert C. Kowert; Myertons, Hood, Kivlin, Kowert & Goetzel, P.C.

(57) ABSTRACT

One embodiment of the present invention provides a system that removes noise from an image. During operation, the system first identifies blobs in the image, wherein a blob is a set of contiguous pixels which possibly represents a character or a portion of a character in the image. Next, the system analyzes the blobs to dynamically determine a "noise threshold" for the blobs. The system then removes blobs from the image which are below the noise threshold.

20 Claims, 7 Drawing Sheets

100

101
Here is a sample header. Notice how small the text is, especially the i-dots and periods.

102
{
This is a sample document which contains some noise that can be generated during the scanning process or may be caused by other factors 104
Here is some more sample text.

Look. Here is a picture that is part of the sample document.
}

Park, Vaughan & Fleming LLP
ATTORNEYS AT LAW 104
104
104
104

103
104
Here is a sample footnote. It is a little bigger than the header. It is possible for the text to be even smaller in some documents.
104

*FIG. 1* periods.

206 → (on "periods.")
204 → (on period)
202 → (on smudge)

FIG. 2A in some documents.

210 → (on period)
208 → (on stray mark)

METHOD AND APPARATUS FOR REMOVING NOISE FROM A DIGITAL IMAGE

This application is a continuation of U.S. application Ser. No. 11/291,552, which was filed on Nov. 30, 2005 now U.S. Pat. No. 7,660,483.

BACKGROUND

1. Field of the Invention

The present invention relates to image processing. More specifically, the present invention relates to a method and apparatus for facilitating the removal of noise from a digital image.

2. Related Art

As businesses and other organizations become more computerized, it is becoming increasingly common to store and maintain electronic versions of paper documents on computer systems. The process of storing a paper document on a computer system typically involves a "document-imaging" process, which converts a copy of the paper document into an electronic document. This document-imaging process typically begins with an imaging step, wherein document page-images are generated using a scanner, a copier, a camera, or any other imaging device. These page-images are typically analyzed and enhanced using an image-processing program before being assembled into a document container, such as a Portable Document Format (PDF) file.

Often, applications need to recognize text from the scanned page-images to facilitate subsequent document-processing operations. This is typically accomplished through an optical character recognition (OCR) process.

Unfortunately, it is very common for the performance of the OCR process to be significantly degraded by the presence of noise in scanned images. Many types of noise and noise-like artifacts arise from the printing and imaging processes. Examples of noise and noise-like artifacts may include quantization noise from the imaging light sensors, dirt on imaging device optics, ink spatters, and toner smudges.

Because of this problem, noise-removal operations are commonly applied to images prior to the OCR process. For example, a common noise-removal operation removes all blobs that are smaller than a threshold number of pixels. However, this may cause small characters such as a "period" to be removed, or may cause a particularly large noise artifact to be retained. Rarely is a fixed threshold value optimal for all character sizes. Consequently, either too much noise is left behind during the noise-removal process, or portions of a scanned image are improperly removed.

Hence, what is needed is a method and apparatus for removing noise from an image without the above-mentioned problems.

SUMMARY

One embodiment of the present invention provides a system that removes noise from an image. During operation, the system first identifies blobs in the image, wherein a blob is a set of contiguous pixels which possibly represents a character or a portion of a character in the image. Next, the system analyzes the blobs to dynamically determine a "noise threshold" for the blobs. The system then removes blobs from the image which are below the noise threshold.

In a variation of this embodiment, analyzing the blobs involves analyzing: the size distribution of the blobs, the number of blobs, locations of the blobs, the blob density of the image or region of the image, and colors of the blobs.

In a variation of this embodiment, the system determines the noise threshold by first identifying text regions in the image and then identifying "key characters" in the text regions, wherein a key character is a small character or a portion of character, such as a period, an i-dot, or a comma. Next, the system computes the average size of the identified key characters, and computes the noise threshold as a fraction of this average size.

In a variation on this embodiment, prior to analyzing the blobs, the system performs an initial noise-removal operation by removing blobs from the image that are below an initial noise threshold.

In a variation on this embodiment, if the determined noise threshold is different from a previous noise threshold, the system repeats the noise-removal process. Furthermore, if the determined noise threshold is reduced from the previous noise threshold, the system restores previously removed blobs which are smaller than the previous noise threshold but larger than the determined noise threshold.

In a variation of this embodiment, a noise-threshold is determined independently for each identified text region.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

The present invention provides a technique for removing noise from an image, and can be applied to any document that may contain noise or any other extraneous artifacts that were not intended to be part of the original document. Although the embodiments of the present invention which are described below operate in conjunction with an optical character recognition (OCR) system, the present invention can easily be modified to work with any noise-removal system for digital images, including noise removal systems that are not associated with optical character recognition. For example, embodiments of the present invention may be applied to digital photography.

During operation, one embodiment of the present invention receives an image in digital form, which may contain both text and images. To improve the OCR process, it is beneficial to remove as much noise as possible from the image. The first step in removing this noise is to identify "blobs" in the image. A "blob" is defined as a cluster of adjacent pixels that may represent a character, part of a character, an object within the image, or a noise artifact. After identifying blobs in the image, the system analyzes the blobs to determine a "noise threshold" for the blobs. (For example, the noise threshold can specify a minimum number of pixels in a blob.) Next, the system removes all blobs which are smaller than the determined noise threshold. Note that a larger noise threshold value will remove more small artifacts, but may also remove characters (or portions of characters), such as periods or i-dots (e.g. the dot portion of the lower-case "i" character). In contrast, a smaller noise threshold will not remove characters (or portions of characters), but will not remove as many noise artifacts. Finally, after the blobs are removed, the system performs an OCR process to identify characters within the remaining blobs.

In one embodiment of the present invention, information gathered from blob analysis can include: blob size (the number of pixels in a blob), blob distribution (the number of blobs in a digital image, or in a section of a digital image), and blob spacing (the number of pixels between blobs). This information can be used to estimate text size. Additionally, text size can be estimated by identifying key characters in the image, and then determining the size of these key characters. Key characters are small characters (or portions of characters), such as periods, i-dots, commas, and ellipses. Key characters are useful in establishing a noise-removal threshold because they are typically the smallest characters (or portions of characters) within a font, and can thus be used to distinguish between characters (or portions of characters) and noise. Key characters may also include letters and numbers which are selected to assist in estimating text size. Typically, baseline spacing between blobs and blob height distribution are good indicators of text size, which can be determined without going through the entire OCR process.

In one embodiment of the present invention, the system determines the noise threshold by first identifying "text regions" in the image and then identifying key characters within the text regions. Next, the system computes the average size of the identified key characters, and computes the noise threshold as a fraction of this average size. Note that the list of key characters can be pre-defined by a user or system administrator. Also note that the key characters may be used to identify a font, which may subsequently help in discriminating characters from noise blobs during subsequent OCR operations.

In one embodiment of the present invention, the above-described process is iterative. In this embodiment, the system starts with an "initial noise threshold." This initial noise threshold is used to perform an initial noise-removal process, wherein blobs which are smaller than the initial noise threshold are removed from the image. (Note that it is desirable to set this initial noise threshold to be smaller than any key characters in the smallest font of interest.) Next, the system analyzes the key characters as described above to determine a new noise threshold. If the new noise threshold is different than a previous noise threshold, the system repeats the noise-removal process. While repeating this process, if the determined noise threshold is reduced from a previous noise threshold, the system restores previously removed blobs which are smaller than the previous noise threshold but larger than the determined noise threshold.

In one embodiment of the present invention, the above-described iterative process continues until a "satisfactory" threshold level is reached. Note that a threshold may be considered "satisfactory" if: (1) the threshold does not change between iterations; (2) the threshold smaller than a predefined noise tolerance level; (3) the change in threshold levels is within a predefined range; or (4) the noise-removal system has executed for a pre-specified amount of time.

In one embodiment of the present invention, the noise removal process is applied to the entire imaged document.

In another embodiment of the present invention, the noise-removal process is applied on a page by page basis. In this embodiment, the process can be applied to each page independently, or alternatively, statistical information can be carried over to each successive page to assist in the setting of an initial noise threshold for each successive page.

In one embodiment of the present invention, a page in the imaged document is divided into sections and each section is processed independently or in conjunction with other sections. This embodiment provides the most flexibility, and in most cases the best results, but may require more processing time.

In one embodiment of the present invention, regardless of how the noise-removal threshold changes, removed blobs are not restored during successive iterations of the noise-removal process. This is likely to decrease the accuracy of the noise-removal process because some blobs which are characters (or portions of characters) may be removed. However, it is also likely to increase the speed of the noise-removal process.

Sample Document

Figure 1:
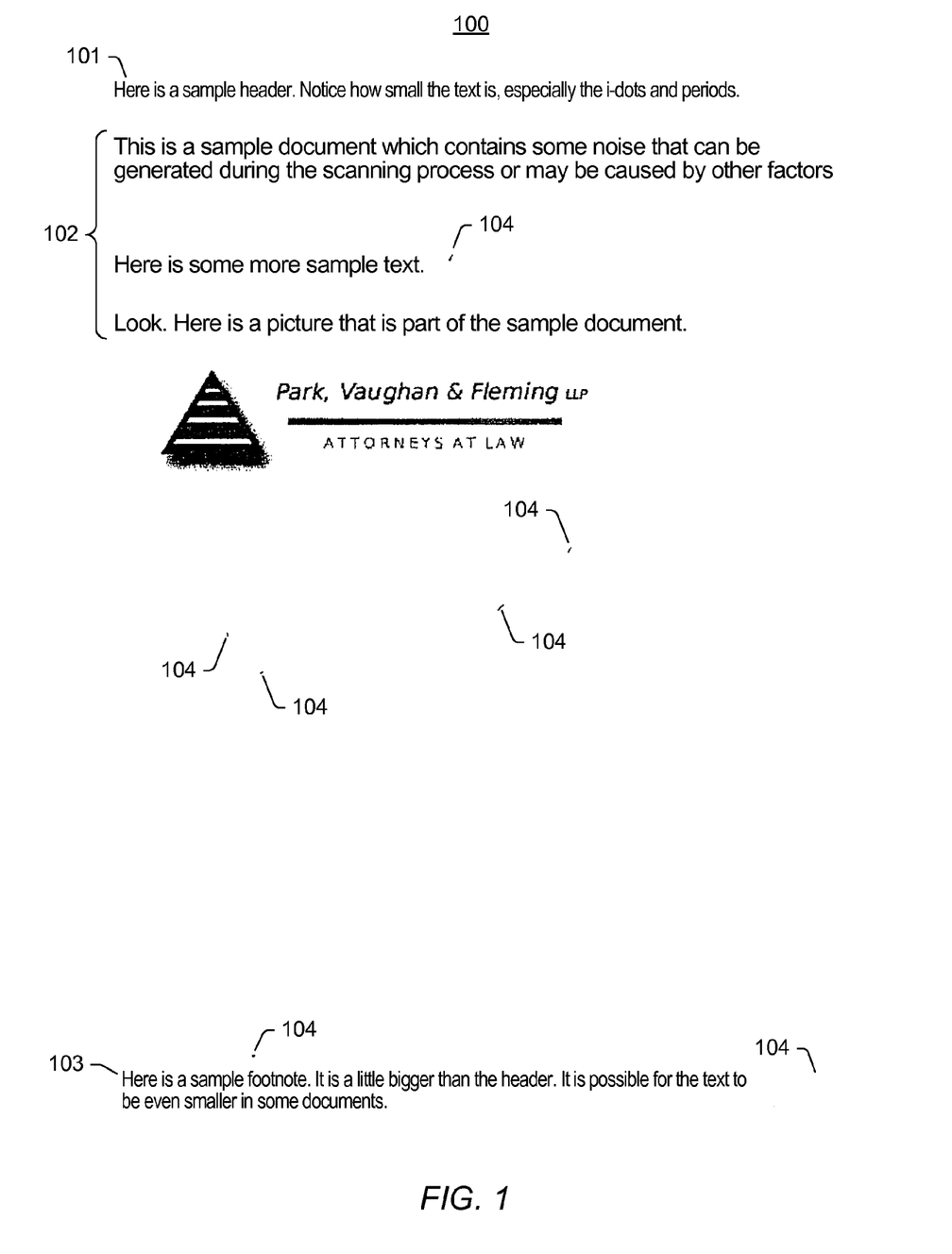
FIG. 1 illustrates a sample document in accordance with an embodiment of the present invention.

FIG. 1 illustrates a sample document in accordance with an embodiment of the present invention. This sample document contains: a header 101, a body 102 and a footnote 103. The body 102 of the sample document contains both text sections and an image which contains text. In addition, several artifacts 104 can be seen throughout the document. Note that this image 100 was created by scanning a document which already contained noise. However, it is also possible that the noise was introduced during the scanning process. Also note that the present invention can be applied to any digital image, and is not limited to scanned documents.

Points of Interest

Figure 2A:
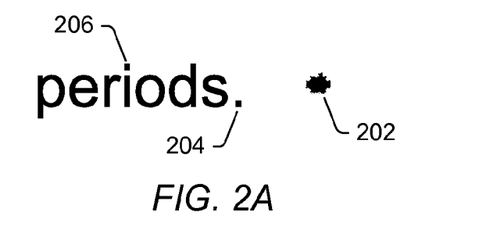
FIG. 2 illustrates several points-of-interest in the sample document in accordance with an embodiment of the present invention.

FIG. 2 illustrates several points of interest in the sample document in accordance with an embodiment of the present invention. More specifically, FIG. 2A illustrates a section of the header 101 from the sample document illustrated in FIG. 1. Three points of interest in FIG. 2A are noise artifact 202, period 204 and i-dot 206.

Selecting an initial noise threshold results in one of several possibilities. If the noise threshold is too fine, noise artifact 202, period 204, and i-dot 206 are removed. If the noise threshold is too coarse, noise artifact 202, period 204, and i-dot 206 remain. Because noise artifact 202 is larger than some of the legitimate blobs, such as period 204 and i-dot 206, there does not exist an initial threshold setting that removes noise artifact 202 and does not remove period 204 and i-dot 206. This example illustrates problems that other noise-removal schemes have, and which embodiments of the present invention solve by adjusting the noise threshold during the OCR process as is described in more detail below.

Figure 2B:
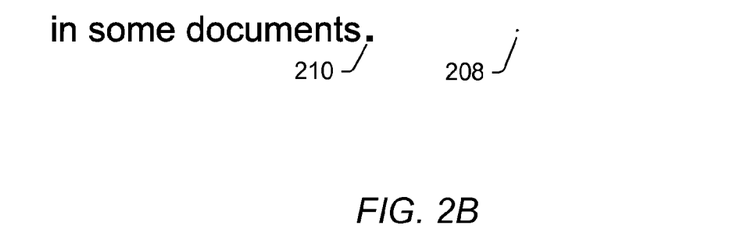

FIG. 2B illustrates a section of the footnote 103 from the sample document illustrated in FIG. 1. Two points of interest are noise artifact 208 and period 210. Choosing a noise threshold level somewhere in between the size of noise artifact 208 and period 210 removes noise artifact 208. This is easily accomplished in a single iteration, and without the refinement occurring during the (OCR) process. In this case, the noise-removal process ends without further refinement of the noise threshold, and the OCR system is able to identify the remaining blobs as valid characters in a font which is recognizable to the OCR system.

Figure 2C:
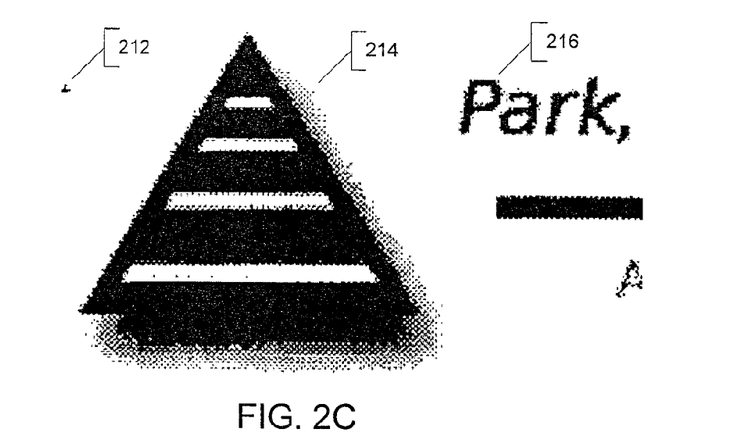

FIG. 2C illustrates a section of the sample document illustrated in FIG. 1. This section includes noise artifact 212, image 214, and text 216. Depending on the format of the file and the format of the section, the section might not be subjected to the noise-removal process. The following description assumes that the section illustrated in FIG. 2C is included in the noise-removal process. If the initial noise threshold is set to a level where noise artifact 212 is removed, then many of the blobs that are part of image 214 will also be removed during the initial noise-removal process. On the other hand, if the initial noise threshold is at a level where image 214 is not altered, then noise artifact 212 will remain after the initial noise-removal stage. One embodiment of the present invention selects an initial noise threshold that results in the removal of noise artifact 212, but without affecting image 214, or alternatively, selects a threshold that neither removes noise artifact 212, nor affects image 214. In the latter situation, noise artifact 212 will be removed during subsequent iterations of the OCR process.

One embodiment of the present invention can process each page of a multi-page document either individually or collectively. Note that if each page is processed individually, the present invention can carry over statistical information from previously-processed pages to assist in forming the initial noise threshold for subsequent pages.

In another embodiment of the present invention, the items which appear in FIG. 2A, FIG. 2B, and FIG. 2C are processed collectively. Because of the numerous noise artifacts which are similar in size to legitimate blobs, most of the noise artifacts will remain during the initial noise-removal process. The remaining noise artifacts will be removed by adjusting the noise threshold during subsequent iterative operations.

Process Overview

Figure 3:
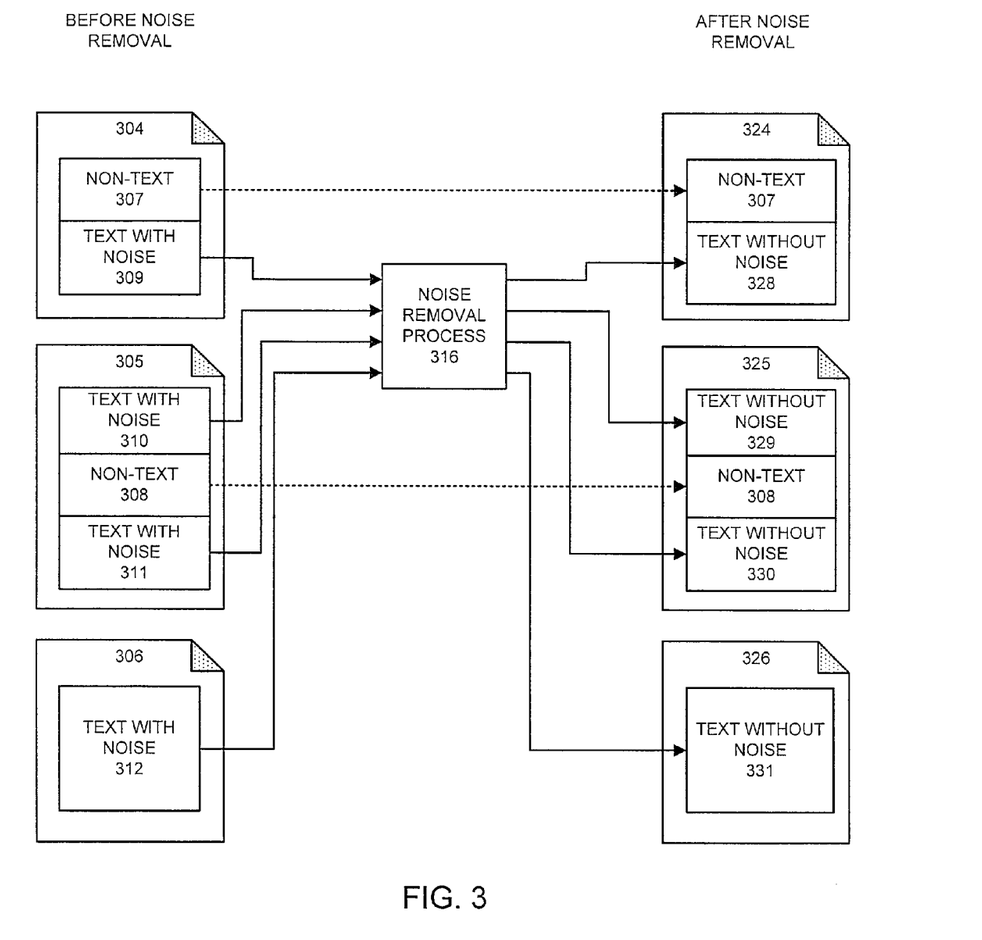
FIG. 3 illustrates a noise-removal process in accordance with an embodiment of the present invention.

FIG. 3 illustrates a noise-removal process in accordance with an embodiment of the present invention. During this process, imaged documents 304, 305, and 306 are received as inputs to noise-removal process 316. Noise-removal process 316 then produces output documents 324, 325, and 326, respectively. Note that regions containing text with noise 309, 310, 311, and 312 are transformed into regions containing text without noise 328, 329, 330, and 331 by the noise-removal process 316. Non-text regions, 307 and 308, in imaged document 304 and 305 are not processed by noise-removal process 316 and remain as non-text regions, 307 and 308, in output documents 324 and 325, respectively.

Computing Environment

Figure 4:
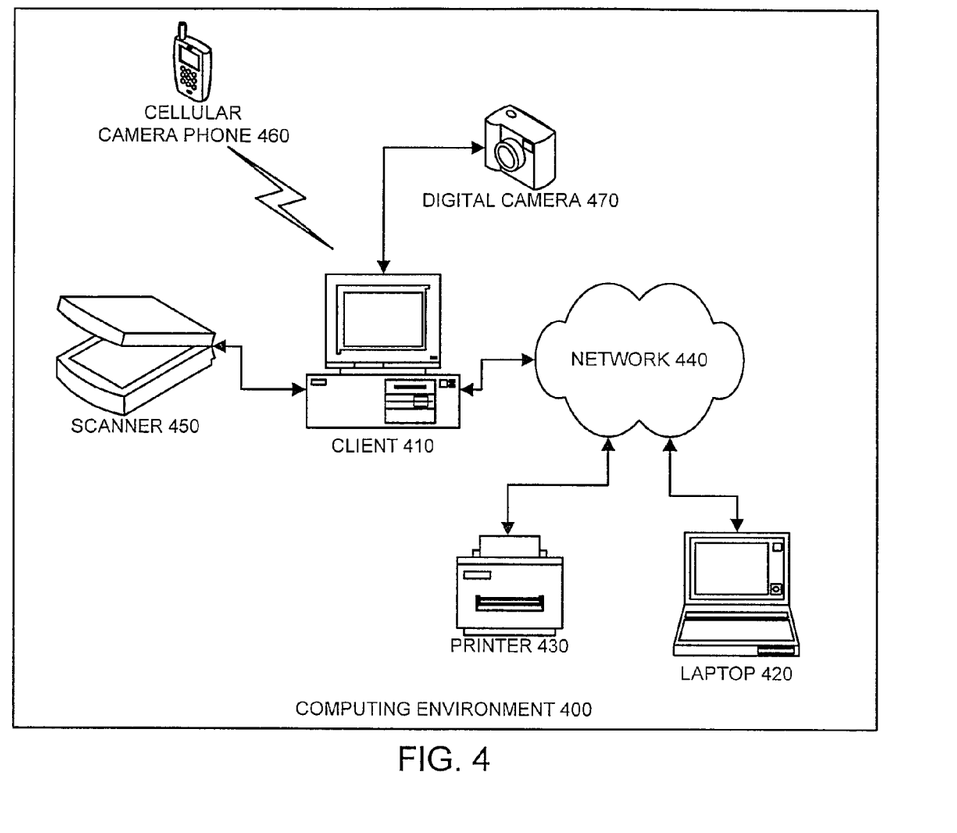
FIG. 4 illustrates a computing environment in accordance with an embodiment of the present invention.

FIG. 4 illustrates a computing environment 400 in accordance with an embodiment of the present invention. Computing environment 400 includes client 410 and laptop 420. Client 410 and laptop 420 are both coupled to network 440. Additionally both client 410 and laptop 420 have the ability to communicate with numerous devices, including printer 430, scanner 450, cellular camera phone 460, and digital camera 470.

Client 410 and laptop 420 can generally include any node on a network including computational capability and including a mechanism for communicating across network 440.

Client 410 and laptop 420 can generally include any type of computer system, including, but not limited to, a computer system based on a microprocessor, a mainframe computer, a digital signal processor, a portable computing device, a personal organizer, a device controller, and a computational engine within an appliance.

Printer 430 can generally include any type of printer, including, but not limited to, personal printers, network printers and multi-function printers which may include copiers, scanners, and facsimile machines.

Scanner 450 can generally include any type of digital scanner, including, but not limited to, standalone scanners and multi-function scanners which may include copiers, printers, and facsimile machines.

Devices, such as printer 430, scanner 450, cellular camera phone 460, and digital camera 470, are capable of capturing an image of a document, or creating an image that may include text. Each of these devices is capable of transmitting the image to client 410 or laptop 420. In one embodiment of the present invention, both client 410 and laptop 420 are capable of removing noise artifacts that may have occurred during the imaging process, using the removal process described herein.

Noise-Removal System

Figure 5:
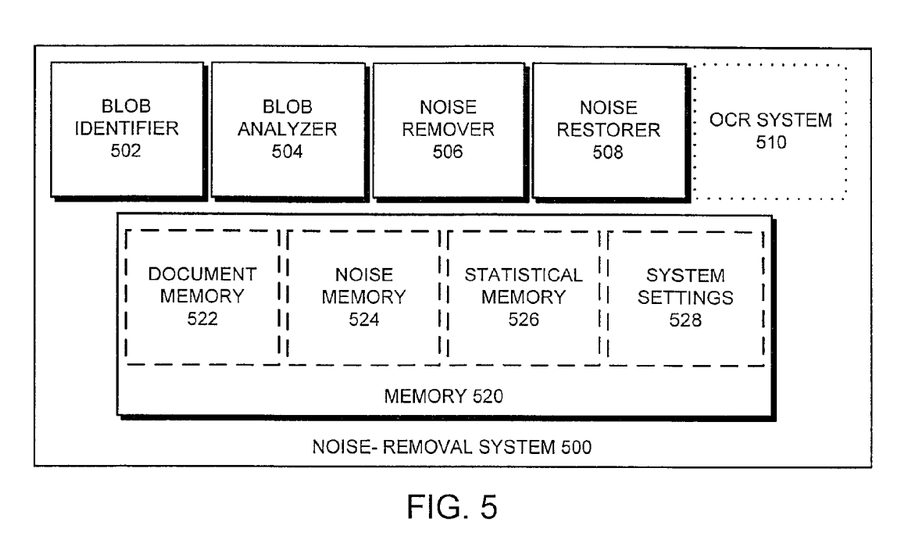
FIG. 5 illustrates a noise-removal system in accordance with an embodiment of the present invention.

FIG. 5 illustrates a noise-removal system 500 in accordance with an embodiment of the present invention. Noise-removal system 500 includes blob identifier 502, blob analyzer 504, noise remover 506, noise restorer 508, OCR system 510 and memory 520. Memory 520 includes document memory 522 (which stores a copy of the images file), noise memory 524, statistical memory 526, and system settings 528.

Blob identifier 502 is used to identify blobs within an imaged document. Once the blobs are identified, blob analyzer 504 analyzes the blobs to determine the noise threshold. Blob analyzer 504 determines the noise threshold based on many factors, including, but not limited to, the number of blobs, the distribution of the blobs, the density of the blobs in different regions, the density of various size blobs in different regions, the position of the blobs, the alignment of the blobs, and the color of the blobs. Once the analysis of the blobs is complete, the resulting statistical information is stored in statistical memory 526. This statistical information can subsequently be used to: further refine system settings; refine the noise threshold; and to refine the noise-removal process for additional regions of the imaged document and additional imaged documents.

Noise remover 506 removes any blobs considered to be noise artifacts based on the noise threshold that was determined by blob analyzer 504. The removed blobs are stored in noise memory 524 in case the noise threshold is altered so that some of the removed blobs need to be restored. If this occurs, noise restorer 508 restores some or all of the removed blobs. The system can determine which blobs to restore by considering the size of the blob, or the location of the blob.

OCR system 510 performs the OCR process after the initial noise-removal process has completed. During this OCR process, the noise-removal is further refined by fine-tuning the noise threshold, as is described in more detail below.

System settings 528 contains system settings for the noise-removal process. In one embodiment of the present invention, these settings include, but are not limited to: a description of the information to be analyzed; a quality value for noise-removal process; an indicator defining when to terminate the noise-removal process; a flag which indicates whether to carry over any information to the next noise-removal task; identifiers for key characters; and an indicator which determines whether to execute the process on a file, a page, or a region of a page. Note that the quality of noise-removal process is inversely related to the speed of the noise-removal process. In addition, the quality of noise-removal process is directly related to the amount of memory available to the noise-removal process.

OCR System

Figure 6:
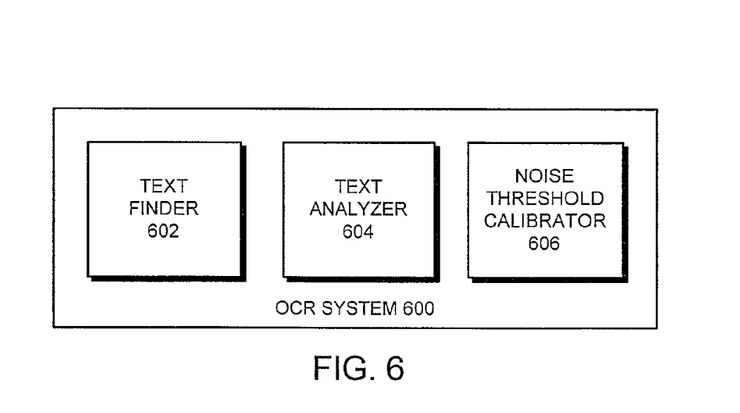
FIG. 6 illustrates an optical-character-recognition (OCR) system in accordance with an embodiment of the present invention.

FIG. 6 illustrates an optical character recognition (OCR) system 600 in accordance with an embodiment of the present invention. OCR system 600 includes text finder 602, text analyzer 604 and noise threshold calibrator 606. Text finder 602 identifies text regions within the imaged document. Techniques for identifying text regions within documents are well-known in the art and will not be described further herein.

Once the text regions have been identified, text analyzer 604 analyzes the text regions both to determine the size of the text and to identify key characters within the text.

The key characters are then analyzed by text analyzer 604 to determine their size (for example, in number of pixels). As was mentioned above, key characters are small characters (or portions of characters) which are used to distinguish characters from noise. The key characters may vary from font to font, but they generally include periods, i-dots, commas, ellipses and other characters (or portions of characters) which are smaller than the other characters in a font. Information ascertained from text analyzer 604 (including for example a noise threshold) is stored in statistical memory 526. This information can be used during subsequent iterations or for other noise-removal tasks. As described below, the output of text analyzer 604 is used to refine the noise threshold.

Noise threshold calibrator 606 adjusts the noise threshold. If the noise threshold is determined to have changed outside of tolerances specified in system settings 528, then an additional noise-removal operation is performed. This additional noise-removal operation may involve restoring some or all previously removed blobs if the noise threshold has decreased.

Noise-Removal Process

Figure 7:
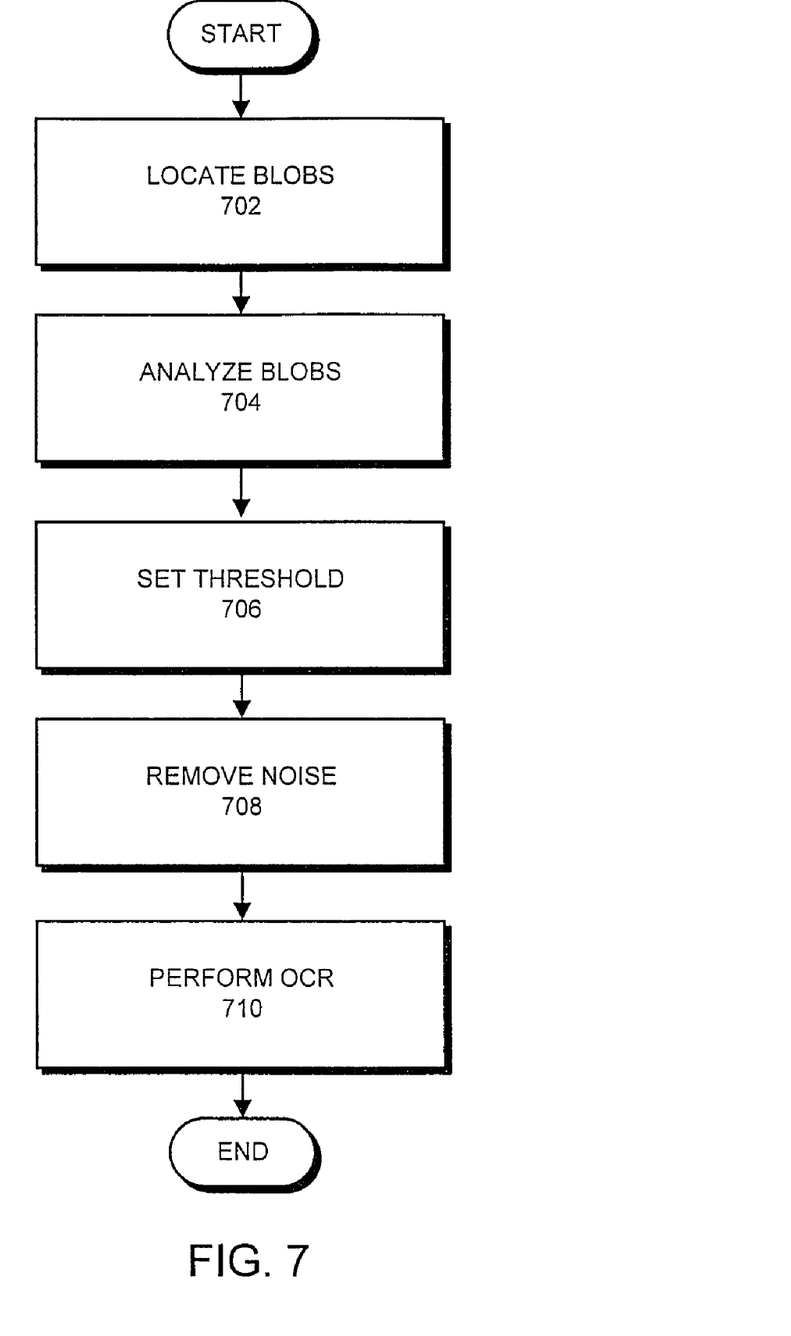
FIG. 7 presents a flowchart illustrating the noise-removal process in accordance with an embodiment of the present invention.

FIG. 7 presents a flowchart illustrating the noise-removal process in accordance with an embodiment of the present invention. The process begins by identifying blobs in the image (step 702). Next, the system analyzes the blobs (step 704) and stores the resulting information in statistical memory 526. This resulting information may include: average blob size, blob density information, blob color, and any other information useful for setting a noise-removal threshold.

Using the results of step 704, the system determines the noise threshold (step 706). In one embodiment of the present invention, the noise threshold is a fraction of the average blob size for key characters in the image. The noise threshold may also differ over various sections of a given page. For example, in one embodiment, if the top 33% of the page has an average key-character blob size of 15 pixels, the noise threshold for the upper 33% of the page may be set to 5 pixels. However, if the lower 66% of the page has an average key-character blob size of 45 pixels, the noise threshold for the lower 66% of the page may be set to 15 pixels. Other factors besides blob size can be used to determine the noise threshold. For example, if systems settings 528 indicate that the image is strictly monochrome, but during the imaging process a red artifact was introduced into the document, the system may identify the red artifact as noise and remove it from the image.

After the noise threshold has been established, the system removes all blobs containing fewer pixels than the noise threshold (step 708). Finally, the system initiates the OCR process (step 710).

OCR Process

The previous section describes a fast and flexible noise-removal process that can be adjusted to match the needs of the user. In one embodiment of the present invention, the process is completed at step 712.

In another embodiment of the present invention, the noise-removal process is refined during the OCR process. This refinement produces a higher quality result than the previously described embodiment.

Figure 8:
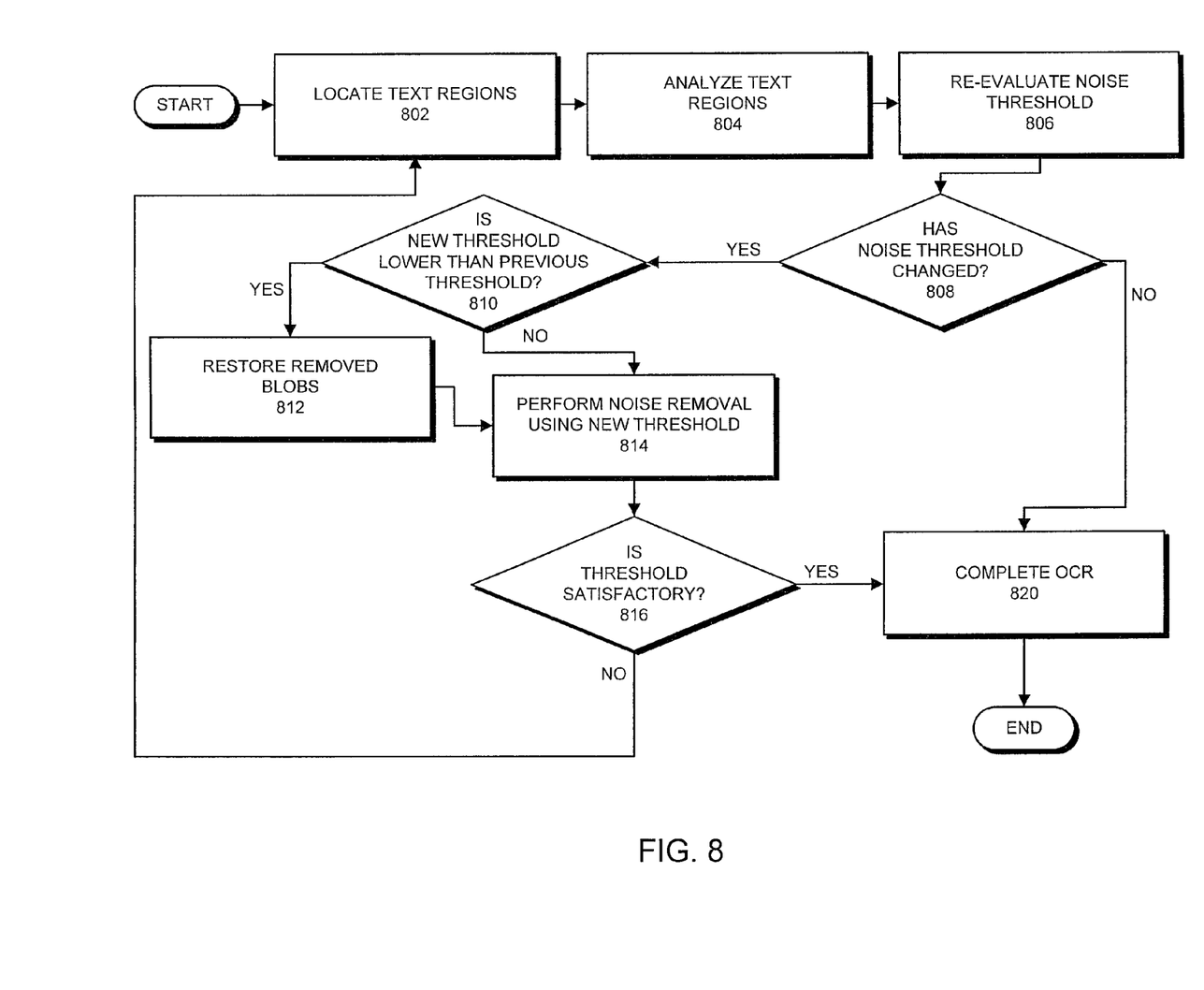
FIG. 8 presents a flowchart illustrating the OCR process which includes a refinement to the noise-removal process in accordance with an embodiment of the present invention.

FIG. 8 presents a flowchart illustrating the OCR process which includes a refinement to the noise-removal process in accordance with an embodiment of the present invention. During this process, the system first identifies text regions within the imaged document (step 802). Note that in one embodiment, text which is part of a figure or image is typically ignored in this step and all future steps of the OCR process.

Once the text regions are identified, the text regions are analyzed (step 804). This analysis may involve, for example, estimating text size, identifying key characters, and identifying the font used for the text. Next, the system re-evaluates the noise threshold for the image based on results of the analysis (step 806).

The system then determines whether the noise threshold has changed (step 808). If not, the system completes the OCR process (step 820). If the noise threshold has changed, the system determines if the new noise threshold is smaller than the previous noise threshold (step 810). If so, previously removed blobs, which was are larger than the new noise threshold but smaller than the initial noise threshold, are restored.

In one embodiment of the present invention, a pre-specified "tolerance level" is also used to determine whether a removed blob should be restored. For example, given a tolerance-level of two pixels, if the old noise threshold was twelve pixels and the new noise threshold is eight pixels, a blob of nine pixels will not be restored. The tolerance level can be indicated by system settings 528.

After removed blobs have been restored (or if the new noise threshold is not lower than the previous noise threshold in step 810), the system repeats the noise-removal process using the new noise threshold (step 814).

Next, the system determines if the new noise threshold is satisfactory (step 816). This determination can be based upon: whether any blobs have been removed; how many blobs have been removed; how many times the noise threshold has been adjusted; or in which direction the noise threshold has been adjusted. If the new noise threshold is satisfactory, the system completes the OCR process (step 820). On the other hand, if the new noise threshold is not satisfactory, the noise-removal process is repeated by returning to step 802.

In one embodiment of the present invention, the system refines the noise-removal process by adjusting system settings 528 before returning to step 802. This can involve adjusting: the information to be analyzed; the quality of noise-removal process; when to terminate the noise-removal process; whether to carry over any information to the next noise-removal task; which characters are key characters; and whether to execute the process on a document, a page, or a region of a page.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for removing noise from an image, comprising:
   performing, by a computer:
      receiving the image;
      analyzing the image, comprising:
         identifying a text region within the image;
         identifying one or more key characters within the text region, wherein a key character is a character or a portion of a character;
         locating a plurality of blobs within the image, wherein a blob is a cluster of adjacent pixels which possibly represent a character or part of a character within the image;
         computing a noise threshold based on a size of the one or more key characters within the text region, wherein blobs of the plurality of blobs that are smaller than said noise threshold are likely to be noise; and
      removing from the image one or more of the plurality of blobs which are smaller than said noise threshold.

2. The method of claim 1, further comprising:
   repeating said analyzing, comprising:
      identifying a different text region within the same image;
      identifying one or more key characters within the different text region;
      locating another plurality of blobs within the same image; and
      computing another noise threshold based on a size of the one or more key characters within the different text region, wherein blobs of the other plurality of blobs that are smaller than said another noise threshold are likely to be noise, and wherein said another noise threshold is computed independently of said noise threshold; and
   removing from the same image one or more of the other plurality of blobs which are smaller than said another noise threshold.

3. The method of claim 1, further comprising, prior to said analyzing the image, performing an initial noise-removal operation by removing blobs from the image that are below an initial noise threshold.

4. The method of claim 3, further comprising, in response to determining that said noise threshold is reduced from the initial noise threshold, restoring previously removed blobs which are smaller than the initial noise threshold but are larger than said noise threshold.

5. The method of claim 1, further comprising:
   analyzing the plurality of blobs, comprising analyzing one or more of blob distribution, blob count, blob location, blob density, and blob color; and
   adjusting said noise threshold based on the analyzing the plurality of blobs.

6. The method of claim 1, wherein said one or more key characters include at least one or more of a period, a comma, an ellipsis, or the dot portion of the lowercase "i" character.

7. The method of claim 1, wherein said noise threshold is a fraction of an average size of the one or more key characters within the text region.

8. A non-transitory computer-readable storage medium storing program instructions that when executed by a computer cause the computer to perform:
   receiving the image;
   analyzing the image, comprising:
      identifying a text region within the image;
      identifying one or more key characters within the text region, wherein a key character is a character or a portion of a character;
      locating a plurality of blobs within the image, wherein a blob is a cluster of adjacent pixels which possibly represent a character or part of a character within the image;
      computing a noise threshold based on a size of the one or more key characters within the text region, wherein blobs of the plurality of blobs that are smaller than said noise threshold are likely to be noise; and
   removing from the image one or more of the plurality of blobs which are smaller than said noise threshold.

9. The computer-readable storage medium of claim 8, wherein the program instructions further cause the computer to perform:
   repeating said analyzing, comprising:
      identifying a different text region within the same image;
      identifying one or more key characters within the different text region;
      locating another plurality of blobs within the same image; and
      computing another noise threshold based on a size of the one or more key characters within the different text region, wherein blobs of the other plurality of blobs that are smaller than said another noise threshold are likely to be noise, and wherein said another noise threshold is computed independently of said noise threshold; and
   removing from the same image one or more of the other plurality of blobs which are smaller than said another noise threshold.

10. The computer-readable storage medium of claim 8, wherein the program instructions further cause the computer to perform, prior to said analyzing the image, an initial noise-removal operation by removing blobs from the image that are below an initial noise threshold.

11. The computer-readable storage medium of claim 10, wherein the program instructions further cause the computer to perform, in response to determining that said noise threshold is reduced from the initial noise threshold, restoring previously removed blobs which are smaller than the initial noise threshold but are larger than said noise threshold.

12. The computer-readable storage medium of claim 8, wherein the program instructions further cause the computer to perform:
   analyzing the plurality of blobs, comprising analyzing one or more of blob distribution, blob count, blob location, blob density, and blob color; and
   adjusting said noise threshold based on the analyzing the plurality of blobs.

13. The computer-readable storage medium of claim 8, wherein said one or more key characters include at least one or more of a period, a comma, an ellipsis, or the dot portion of the lowercase "i" character.

14. The computer-readable storage medium of claim 8, wherein said noise threshold is a fraction of an average size of the one or more key characters within the text region.

15. A system that removes noise from an image, comprising:
   a processor; and
   memory storing program instructions executable by the processor to perform:
      receiving the image;
      analyzing the image, comprising:
         identifying a text region within the image;
         identifying one or more key characters within the text region, wherein a key character is a character or a portion of a character;
         locating a plurality of blobs within the image, wherein a blob is a cluster of adjacent pixels which possibly represent a character or part of a character within the image;
         computing a noise threshold based on a size of the one or more key characters within the text region, wherein blobs of the plurality of blobs that are smaller than said noise threshold are likely to be noise; and
      removing from the image one or more of the plurality of blobs which are smaller than said noise threshold.

16. The system of claim 15, wherein the program instructions are further executable to perform:
   repeating said analyzing, comprising:
      identifying a different text region within the same image;
      identifying one or more key characters within the different text region;
      locating another plurality of blobs within the same image; and
      computing another noise threshold based on a size of the one or more key characters within the different text region, wherein blobs of the other plurality of blobs that are smaller than said another noise threshold are likely to be noise, and wherein said another noise threshold is computed independently of said noise threshold; and
   removing from the same image one or more of the other plurality of blobs which are smaller than said another noise threshold.

17. The system of claim 15, wherein the program instructions are further executable to perform, prior to said analyzing the image, an initial noise-removal operation by removing blobs from the image that are below an initial noise threshold.

18. The system of claim 17, wherein the program instructions are further executable to perform, in response to determining that said noise threshold is reduced from the initial noise threshold, restoring previously removed blobs which are smaller than the initial noise threshold but are larger than said noise threshold.

19. The system of claim 15, wherein the program instructions are further executable to perform:
   analyzing the plurality of blobs, comprising analyzing one or more of blob distribution, blob count, blob location, blob density, and blob color; and
   adjusting said noise threshold based on the analyzing the plurality of blobs.

20. The system of claim 15, wherein said one or more key characters include at least one or more of a period, a comma, an ellipsis, or the dot portion of the lowercase "i" character, and wherein said noise threshold is a fraction of an average size of the one or more key characters within the text region.

* * * * *